United States Patent
McInnes

(10) Patent No.: US 7,324,705 B2
(45) Date of Patent: Jan. 29, 2008

(54) IMAGE DISTORTION SYSTEM AND METHOD

(75) Inventor: Leland Graeme McInnes, London (CA)

(73) Assignee: Compudigm International Limited, Wellington (NZ)

( * ) Notice: Subject to any disclaimer, the term of this patent is extended or adjusted under 35 U.S.C. 154(b) by 632 days.

(21) Appl. No.: 10/701,509

(22) Filed: Nov. 6, 2003

(65) Prior Publication Data

US 2005/0099436 A1    May 12, 2005

(51) Int. Cl.
*G06K 9/40* (2006.01)

(52) U.S. Cl. ............... 382/275; 382/276; 382/293; 382/298; 345/646; 345/647

(58) Field of Classification Search ............... 382/275, 382/276, 293, 298; 345/646, 647
See application file for complete search history.

(56) References Cited

U.S. PATENT DOCUMENTS

| | | | | |
|---|---|---|---|---|
| 4,790,028 A | * | 12/1988 | Ramage | 382/298 |
| 6,178,272 B1 | * | 1/2001 | Segman | 382/298 |
| 6,525,744 B1 | * | 2/2003 | Poggio et al. | 345/619 |
| 2005/0286799 A1 | * | 12/2005 | Huang et al. | 382/275 |

FOREIGN PATENT DOCUMENTS

WO    WO 2091306 A1 * 11/2002

OTHER PUBLICATIONS

Keahey, T.—"Nonlinear Magnification"—Indiana University—Ph. D. Dissertation—Aug. 1998—176 pages.*

* cited by examiner

*Primary Examiner*—Jingge Wu
*Assistant Examiner*—Bernard Krasnic

(57) ABSTRACT

A method and system of distorting an image, particularly but not solely designed for magnifying parts of an image more than the remainder of the image. The method comprises the steps of maintaining in computer memory a set of base data values representing an image to be subjected to a transformation function; calculating a non identity approximation of the transformation function; retrieving from computer memory one or more of the base data values; calculating an intended magnification value ($M_c$) for one or more of the retrieved base data values; calculating an estimated magnification value ($M_s$) for one or more of the retrieved base data values; storing in computer memory the estimated magnification values as a set of transformed data values representing the transformed image; calculating the difference ($M_E$) between the intended magnification value(s) and the estimated magnification value(s); and repeating steps (c) to (g) until $M_E$ is less than a predefined threshold.

3 Claims, 4 Drawing Sheets

IMAGE DISTORTION SYSTEM AND METHOD

FIELD OF INVENTION

The invention relates to a system and method for image distortion, particularly but not solely designed for magnifying parts of an image more than the remainder of the image. The invention also has application in distorting any space or object.

BACKGROUND TO INVENTION

It has become increasingly common to use graphic images to display different types of data. Such displays are easy to interpret and provide the user with an overall picture of a particular data set. One example is our patent specification WO 00/77682 to Compudigm International Limited entitled "Data Visualisation System and Method" in which data values are contoured around a series of points.

It would be particularly desirable to further enhance the graphic representations displayed to a user. One example of enhancement would be to magnify part of but not all of a representation. A floating magnification window could be provided on a computer display which tracks a mouse cursor or other pointing device and magnifies the region of the screen under the cursor. For optimal results, it is preferable to maintain the same size of the overall representation during a magnification process. This will mean that parts of the image will be magnified, parts of the image will remain in that original form, and other parts of the image will be compressed to counteract the effect of magnification.

Non-linear magnification is one technique to achieve magnification in this manner. Non-linear magnification is characterised by enhancing resolution of a particular area or areas of interest, preserving the overall global context of an image, providing magnification within the existing image and not in a separate window, and providing non-occlusion, meaning that magnification of one area does not block out surrounding areas. Algorithms for performing such non-linear magnification are described in Keahey, T. A. "Non-linear Magnification" Ph.D. Dissertation, Indiana University Computer Science, December 1997, Keahey, T. A. and Robertson, E. L. "Techniques for Non-Linear Magnification Transformations", Proceedings of the IEEE Symposium on Information Visualisation, IEEE Visualisation, pp 38-45, October 1996 and Keahey, T. A. and Robertson, E. L. "Nonlinear Magnification Fields", Proceedings of the IEEE Visualisation Conference, IEEE Visualisation, pp 51-58, 1997.

Such algorithms typically require iteration over a computationally expensive series of calculations. It would be particularly advantageous to reduce the number of iterations required by calculating a series of values for a non-linear magnification which are close to the final result acquired by algorithms such as the Keahey algorithm. More efficient iterative techniques would be less computationally expensive than existing methods.

SUMMARY OF INVENTION

In broad terms in one form the invention comprises an image distortion method comprising the steps of:
(a) maintaining in computer memory a set of base data values representing an image to be subjected to a transformation function;
(b) calculating an approximation of the transformation function;
(c) retrieving from computer memory one or more of the data values;
(d) calculating an intended magnification value ($M_S$) for one or more of the retrieved data values;
(e) calculating an estimated magnification value ($M_c$) for one or more of the retrieved data values;
(f) storing in computer memory the estimated magnification values as a set of transformed data values representing the transformed image;
(g) calculating the difference ($M_E$) between the intended magnification value(s) and the estimated magnification value(s); and
(h) repeating steps (c) to (g) until $M_E$ is less than a pre-defined threshold.

Preferably the step of calculating an approximation of the transformation function further comprises the steps of:
(a) defining an approximating function to approximate the transformation function, the approximating function including one or more parameters;
(b) defining an initial value of one of the parameters (p);
(c) calculating the maximal value of the derivative of the approximating function using the parameter p;
(d) calculating the maximal intended magnification value using the parameter p;
(e) calculating the difference between the maximal value of the derivative and the maximal value of the intended magnification value;
(f) adjusting the value of p; and
(g) repeating steps (c) to (f) until the difference between the maximal value of the derivative and the maximal value of the intended magnification value is less than a pre-defined threshold.

In broad terms in another form the invention comprises an image distortion system for subjecting a set of base data values representing an image to a transformation function, the system comprising:
a transformation approximation component configured to calculate an approximation of the transformation function;
an intended magnification calculator configured to calculate an intended magnification value ($M_s$) for one or more of the data values;
an estimated magnification calculator configured to calculate an estimated magnification value ($M_c$) for one or more of the data values; and
a convergence measurer configured to compare the difference between the intended magnification value and the estimated magnification value ($M_E$) with a threshold value.

BRIEF DESCRIPTION OF FIGURES

Preferred forms of the image distortion system and method will now be described with reference to the accompanying Figures in which.

DETAILED DESCRIPTION OF PREFERRED FORMS

Figure 1:
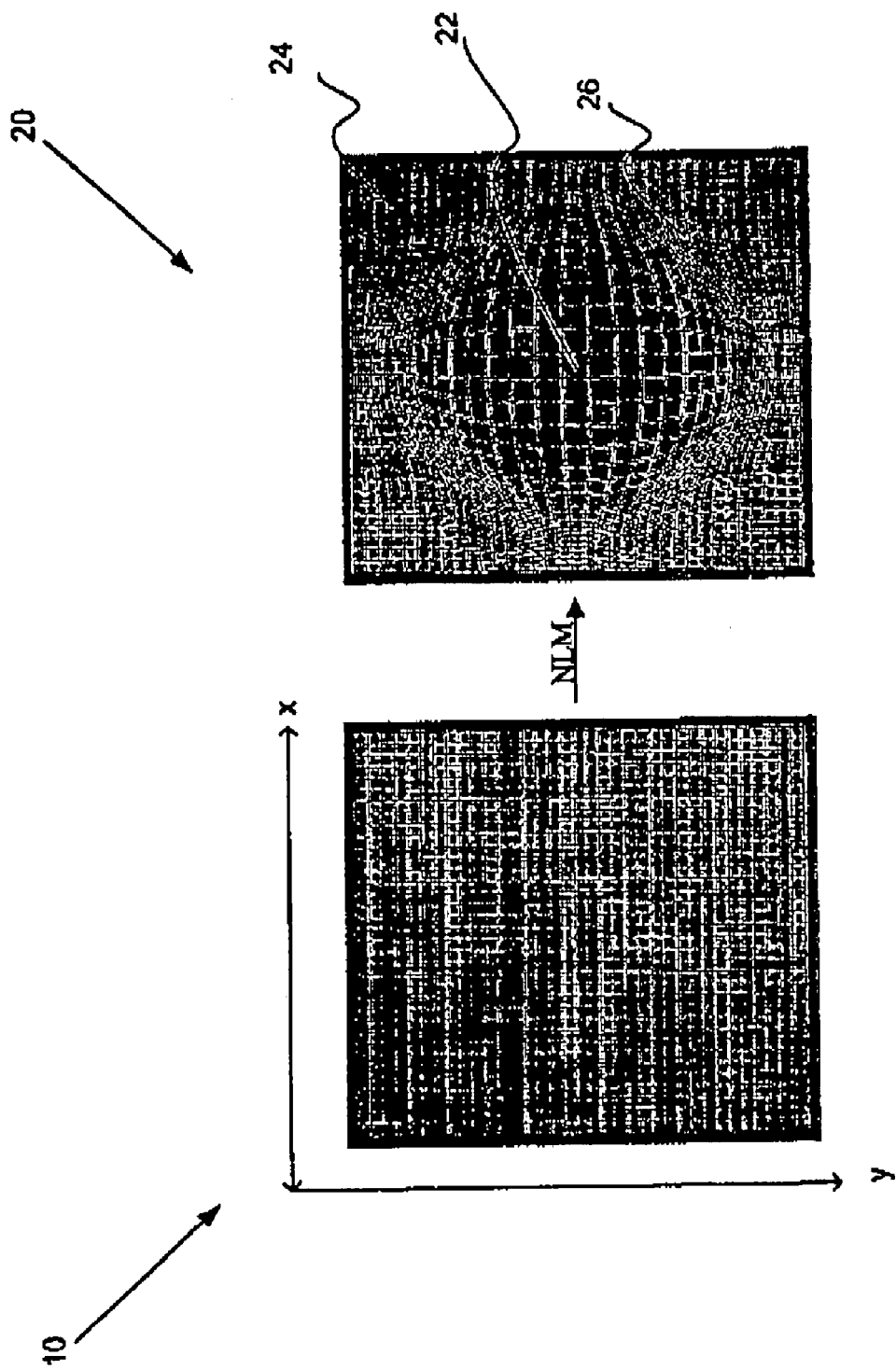
FIG. 1 shows an example of non-linear magnification.

FIG. 1 illustrates the application of non-linear magnification on a base image 10 resulting in a distorted image 20. The base image 10 is preferably stored in a data memory as a set of base data values. The base image represents an image to be subjected to a non-linear magnification. The set of base data values preferably comprises a series of data sets. Each data set includes an x co-ordinate and a y co-ordinate indicating the position within an image which the data set represents. The data set preferably also includes an intensity or colour value. The intensity could be an integer value representing a grey scale. Alternatively, the data set could include a series of data values representing a particular colour.

In FIG. 1, the base data values are configured to display a regular grid on a screen. A non-linear magnification is then performed on the base image. The intended effect is that area 22 is magnified to a pre-defined degree and other areas such as that indicated at 24 undergo no magnification. As shown in FIG. 1, the overall size of the image is not changed. Accordingly, it is necessary to compress other areas of the image to allow for the magnification at area 22. An example of a compressed area is indicated at 26.

It will be appreciated that to perform such a non-linear magnification on the base image involves manipulating the data sets of the base image 10 to alter both the co-ordinate data and the intensity or colour data of some of the data sets, particularly those data sets used to display areas of the transformed image such as area 22 and area 26. Algorithms used to perform such a transformation are typically complex and computationally expensive. The invention provides a method of simplifying and reducing the number of calculations required to be performed by creating an initial transformation function which is very close to the result desired by the existing algorithms.

Figure 2:
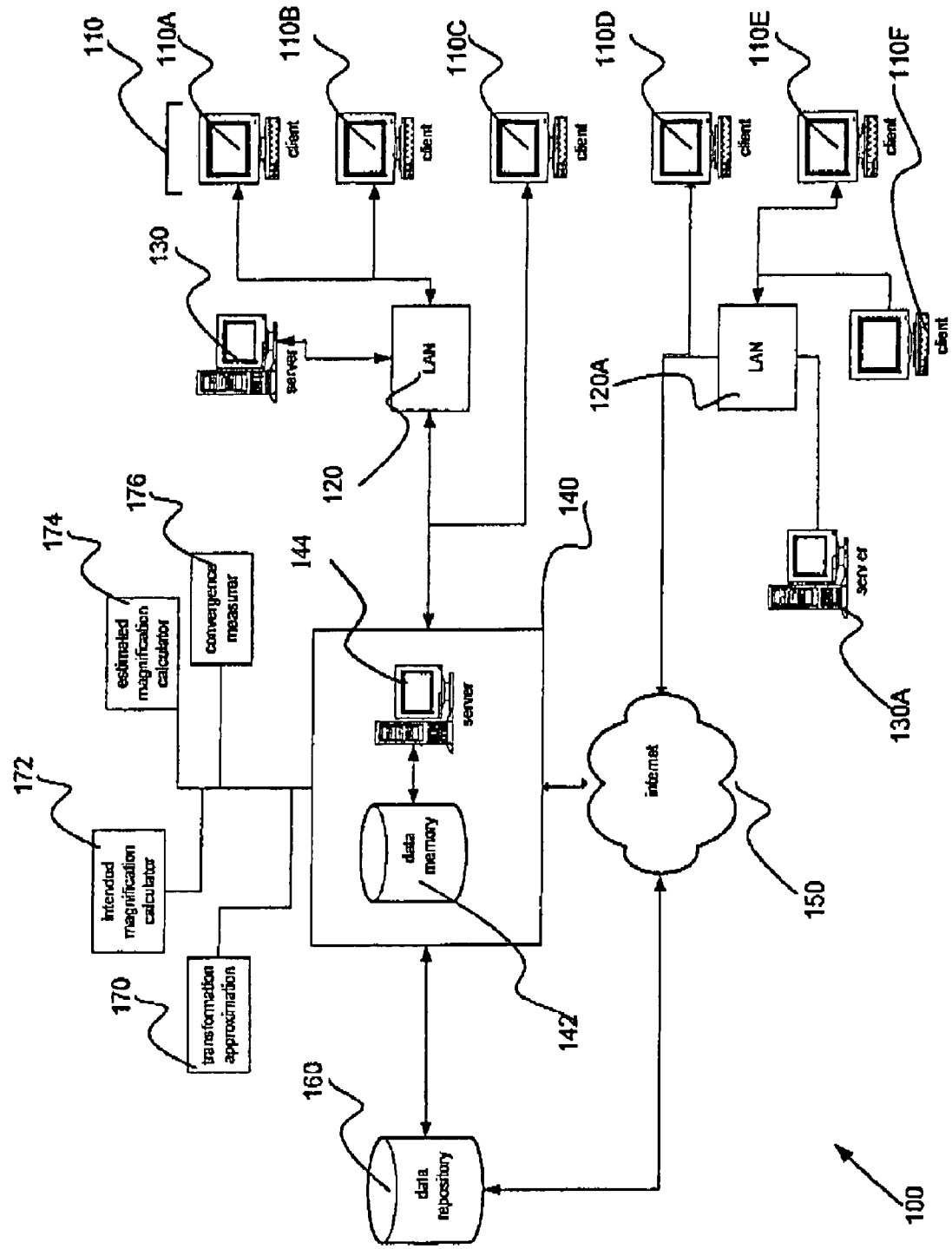
FIG. 2 shows a block diagram of a system in which one form of the invention may be implemented.

FIG. 2 illustrates a block diagram of the preferred system 100 in which one form of the present invention may be implemented. The system includes one or more clients 110 for example 110A, 110B, 110C, 110D, 110E and 110F, which each may comprise a personal computer or workstation described below. Each client 110 is interfaced to the rest of the system 100, either directly, through a local area network or LAN, or through the Internet.

Clients 110A and 110B for example are connected to a network 120, such as a local area network or LAN. The network 120 could be connected to a suitable network server 130 and communicate with the rest of the system, for example workstation 140 as shown. Client 110C is shown connected directly to the workstation 140. Clients 110D, 110E and 110F are shown connected to the workstation 140 through the Internet 150.

Client 110D is shown as connected to the Internet 150 with a dial-up or other suitable connection and clients 110E and 110F are shown connected to a network 120A such as a local area network or LAN with the network 120A connected to a suitable network server 130A.

The preferred system further includes a data repository 160, for example a data warehouse maintained in a memory. It is envisaged that the data repository may alternatively comprise a single database, a collection of databases, or a data mart.

One preferred form of the system comprises a personal computer or workstation 140 operating under the control of appropriate operating and application software having a data memory 142 connected to a server 144. The invention is arranged to retrieve data, for example data representing images, from the data repository 160 or data memory 142, process the data, and to display the data as distorted images on a client workstation 110, as will be described below.

The system 100 includes a transformation approximation component 170, an intended magnification calculator 172, an estimated magnification calculator 174, and a convergence measurer 176 as will be described below. These components could be implemented as software programs installed and operating in computer memory, or alternatively could be implemented in hardware form functioning in an equivalent way.

Figure 3:
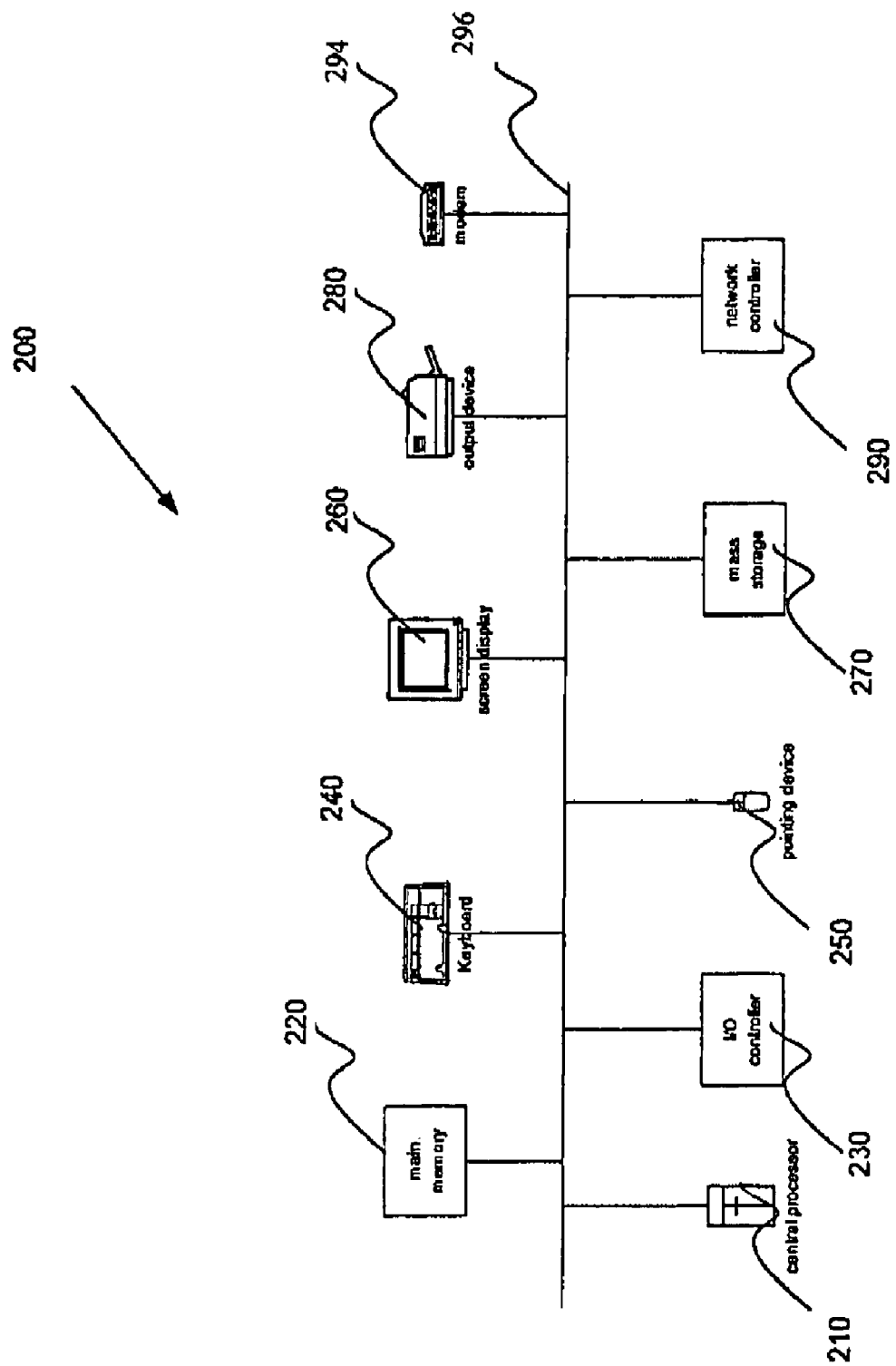
FIG. 3 shows the preferred system architecture of hardware on which the present invention may be implemented.

FIG. 3 shows the preferred system architecture of a client 110, or workstation 140. The computer system 200 typically comprises a central processor 210, a main memory 220 for example RAM, and an input/output controller 230. The computer system 200 also comprises peripherals such as a keyboard 240, a pointing device 250 for example a mouse, a display or screen device 260, a mass storage memory 270 for example a hard disk, floppy disk or optical disc, and an output device 280 for example a printer. The system 200 could also include a network interface card or controller 290 and/or a modem 300. The individual components of this system 200 could communicate through a system bus 310. Alternatively, the various components of the system 200 could be distributed over and connected to each other by a network or series of networks.

Non-linear magnification and in particular magnification-based magnification is set out in Keahey, T. A., "Nonlinear Magnification", Ph.D. Dissertation, Indiana University Computer Science, December 1997, pp 55-115. A distinction is made between magnification and transformation functions. The transformation function directly stretches and compresses the image represented by the data values, while the magnification function which is the derivative of the transformation function represents the magnification values which are implicit in the transformation function. The prior art describes an iterative method for computing a transformation from a given magnification field. The invention provides initial transformation data values close to the desired result which reduces the number of iterations required.

The magnification employs a transformation function t which moves the points of a rectangular domain D (for example a base image) within a frame (u,v)=t(x,y). t is a vector function which is expressed as:

$$t(x, y) = \begin{pmatrix} u \\ v \end{pmatrix} = \begin{pmatrix} t_u(x, y) \\ t_v(x, y) \end{pmatrix} \quad (1)$$

The vector function t takes individual points in the base image and in some cases causes regional expansion around that point. A magnification field m is a 2D scalar field of the form z=m(x,y) which gives this regional expansion caused by t around a point. m is normally represented by a quadrilateral mesh m(m=m∘g).

The magnification of a point in a base image is conceptually obtained by comparing the area of a region R before and after the transformation has been applied and to make magnification the ratio of those areas. This can be represented by the following equation:

$$\text{magnification} = \frac{\text{Area}(t(R))}{\text{Area}(R)} \qquad (2)$$

This area-based approach can be defined more precisely in terms of limits by creating an area-based derivative defined as:

$$\text{magnification} = \lim_{h \to 0} \frac{\text{Area}(t(R))}{4h^2} \qquad (3)$$

Magnification is defined as a ratio of areas, and it is necessary to define how to compute the area of a non-linearly transformed region r in order to find that ratio. In practice, an approximation of these areas is calculated numerically. The mathematical formulation for computing the area of t(R) is performed with a double integral as follows:

$$\text{Area}[t(R)] = \iint_R dA_{xy} \qquad (4)$$

The formulation for the solution of this integral is defined as:

$$\text{Area}[t(R)] = \iint_R \left| \tau\left(\frac{u, v}{x, y}\right) \right| dA_{xy} \qquad (5)$$

Given the integral of the above equation for finding the area of a non-linearly transformed region, the local magnification is then calculated as the ratio of the areas of the transformed and original regions as follows:

$$m(x, y) = \lim_{A_{xy} \to 0} \frac{\iint_R \left| \tau\left(\frac{u, v}{x, y}\right) \right| dA_{xy}}{A_{xy}} \qquad (6)$$

The above equation effectively represents the ratio of the range area to the domain area. In practice, this limit is approximated using an area-based function which computes the local magnification for each point in the image.

For the purposes of the invention, a magnification field is defined as the function $M:R^2 \to R$. Generally however, M is considered on a closed subset $D \subset R^2$. The magnification field M has the further property that M(x,y) is the user defined magnification value at (x,y) $\in$ D. It is envisaged that there are no particular constraints on continuity and differentiability of M, although it is preferred that M$\in$C.

The transformation is defined as the function $T:R^2 \to R^2$, with $T \in C^\infty$. It is also assumed that:

$$T(x,y) = (T_x(x,y), T_y(x,y)). \qquad (7)$$

The relation between T and M in the prior art is defined as follows:

$$\frac{\partial T_x}{\partial x} \cdot \frac{\partial T_y}{\partial y} = M \qquad (8)$$

The above relation is not strictly correct in that it assumes that magnification is the rate of change of area under T. Derivation from first principles yields the following more accurate equation:

$$\frac{\partial T_y}{\partial y} \cdot \frac{\partial T_x}{\partial x} - \frac{\partial T_x}{\partial y} \cdot \frac{\partial T_y}{\partial x} = M \qquad (9)$$

The derivation of equation (9) from equation (8) is set out below. Magnification can be defined as the rate of change of the area under a transformation as described above. Considering an initial square of size h×h, it is necessary to compare the initial square to the area of the quadrilateral formed by the positions of the corner points mapped by T. This process produces a general quadrilateral having area $$\frac{1}{4}\sqrt{p^2 q^2 - (a^2 + c^2 - b^2 - d^2)^2}.$$

Substituting this calculation into equation (7) above becomes (after simplification)

$$(T_y(x,y-h) - T_y(x,y+h))(T_x(x-h,y) - T_x(x+h,y)) \qquad (10)$$

Substitution into a first principles equation yields $$\frac{dT}{dA} = \lim_{h \to 0} \left( \frac{(T_y(x, y-h) - T_y(x, y+h))(T_x(x-h, y) - T_x(x+h, y))}{4h^2} \right) - \left( \frac{(T_x(x, y-h) - T_x(x, y+h))(T_y(x-h, y) - T_y(x+h, y))}{4h^2} \right)$$

Which can be rearranged as:

$$\lim_{h \to 0} \left( \frac{\frac{T_y(x, y-h) - T_y(x, y+h)}{2h}}{\frac{T_x(x-h, y) - T_x(x+h, y)}{2h}} \right) - \lim_{h \to 0} \left( \frac{\frac{T_x(x, y-h) - T_x(x, y+h)}{2h}}{\frac{T_y(x-h, y) - T_y(x+h, y)}{2h}} \right)$$

Then, assuming that the required limits exist, we can split the factors to get limits which simplify to:

$$\frac{\partial T_y}{\partial y} \cdot \frac{\partial T_x}{\partial x} - \frac{\partial T_x}{\partial y} \cdot \frac{\partial T_y}{\partial x} \qquad (11)$$

It is assumed that for most T, the value of $$\frac{\partial T_x}{\partial y} \cdot \frac{\partial T_y}{\partial x}$$

will be neglible, and so we have recognised that equation (8) above may be used as a fast approximation.

For the purposes of the invention, a discrete approximation is defined from the above generalised definitions. By defining M as a n×n matrix where $M_{i,j}=M(x,y)$, and T as a n×n×2 tensor where $T_{i,j,k}=T(i,j)_k$, the relation between T and M can be reformulated in terms of discrete approximations of the derivatives. It follows that:

$$M_{i,j} = \frac{1}{4} \cdot (T_{i+1,j,1} - T_{i-1,j,1})(T_{i,j+1,2} - T_{i,j-1,2}) \tag{12}$$

Figure 4:
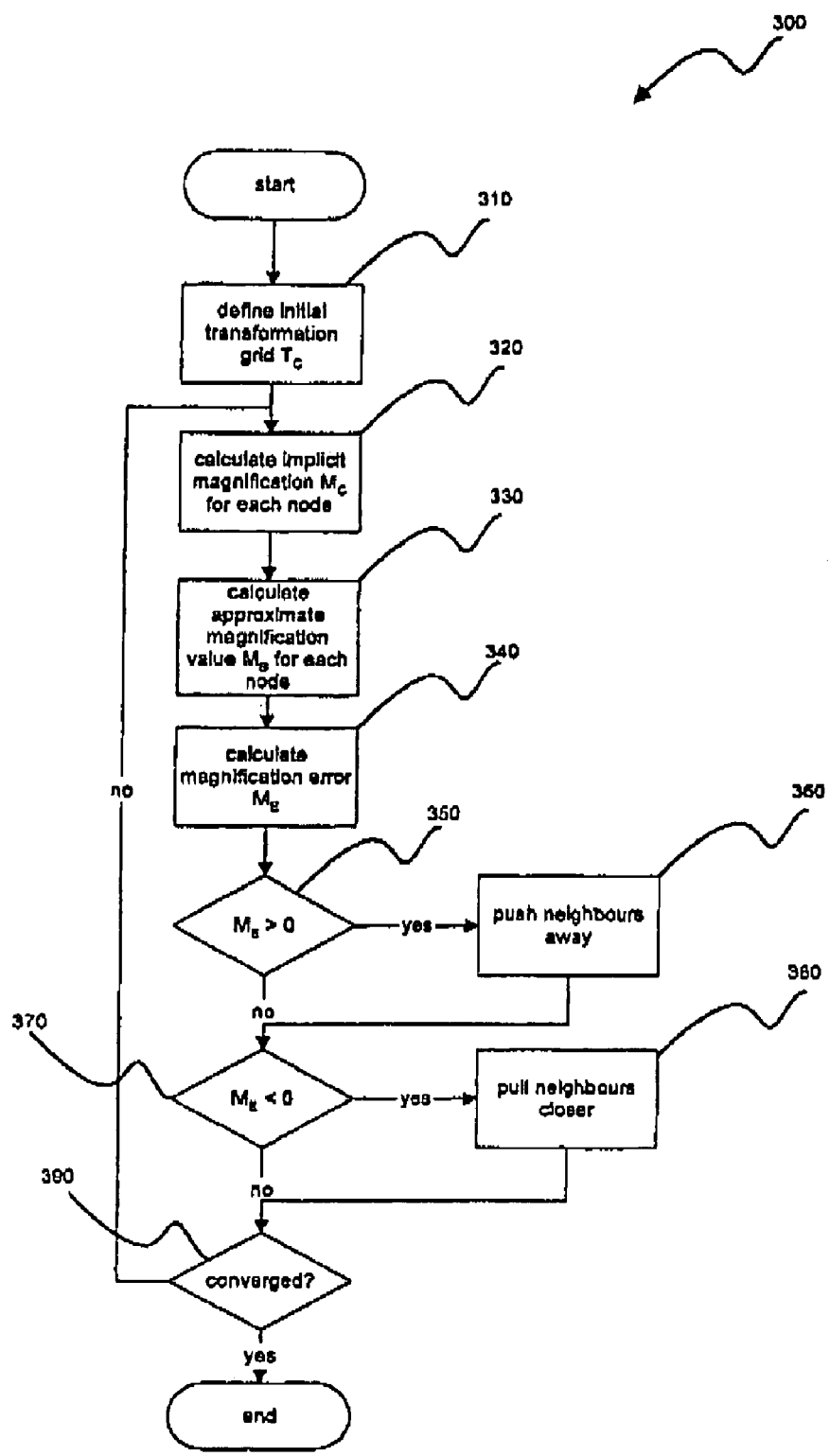
FIG. 4 shows a preferred method of performing the invention.

FIG. 4 illustrates the iterative process in accordance with the invention for finding a transformation corresponding to a given magnification field. The iterative process essentially calculates an approximate transformation grid $T_c$ from a specified magnification. The implicit magnification $M_s$ is calculated from a pre-specified transformation function $T_c$. The magnification error $M_E$ is calculated as $M_s - M_c$. The magnification error $M_E$ is then used to further refine the approximation $T_c$.

The algorithm is indicated at 300 in FIG. 4. As indicated at 310, an initial approximation of the transformation grid $T_c$ is first defined. In the prior art algorithm, $T_c$ is initialised to the identity transformation and further calculations are performed on this identity transformation. The invention, as described below, provides an alternative initial transformation grid $T_c$ and method for producing this transformation grid to reduce the number of calculations required in further steps of the algorithm 300.

As indicated at 320, the implicit magnification $M_s$ is calculated for each node or data value in the base image. The implicit magnification $M_s$ represents the desired or intended magnification values. These values are calculated by a computer software program shown as the intended magnification calculator 172 in FIG. 2, which implements a pre-specified transformation function $T_c$. The implicit magnification $M_s$ is calculated from this pre-specified transformation function $T_c$.

As shown at 330, the approximate magnification value $M_s$ is calculated for each value also. The approximate magnification values $M_s$ are calculated with a computer program stored in a computer memory shown as an estimate magnification calculator 174 in FIG. 2.

Indicated at 340, the magnification error $M_E$ is calculated as $M_E = M_s - M_c$. As shown at 350, if the magnification error for a particular node is greater than 0, as shown at 360, the algorithm "pushes" the neighbours of that node in $T_c$ away from the current node. On the other hand, if $M_E$ is less than 0 for a particular node as shown at 370, the algorithm "pulls" the neighbours of that node in $T_c$ closer to the current node as shown at 380. The pushing and pulling operations could be performed in a radial fashion along a ray or in an orthogonal manner in the x or y direction only.

The various magnification error $M_E$ values are then examined to determine whether the algorithm has "converged" as indicated at 390. By convergence, it is meant that the algorithm has calculated the best and most stable estimate transformation grid $T_c$.

One method of measuring convergence is with the root mean squared area as the convergence estimate as indicated below:

$$RMSE = \sqrt{\frac{1}{(p \times q)} \sum_{i=1}^{p} \sum_{j=1}^{q} M_E(i,j)^2} \tag{13}$$

The algorithm could specify a convergence threshold for the root mean squared error (RMSE) for example the value 0.05. This value would represent the point beyond which further computation does not usually result in visually distinguishable refinements in the transformation.

Convergence could be speeded up by weighting regions of higher magnification or weighting the displacements based on the differences between a node and its neighbours. However, in practice a significant number of iterations are generally required before the algorithm converges.

In one form the invention provides an alternative initial transformation grid $T_c$ which is closer to the best estimate transformation grid $T_c$ than the identity function indicated at 310. Assuming $T_c$ is the approximation of the desired transformation, G can be defined as a function such that for a fixed $M_s$, $G(p)=T_g$. This value $T_g$ can be found as follows:

$$T_{g_{i,j}} = \begin{pmatrix} (n-1)\dfrac{M^P_{S_{i-1,j}} + M^P_{S_{i,j}}}{M^P_{S_{1,j}} + M^P_{S_{n,j}} + 2\sum_{l=2}^{n-1} M^P_{S_{l,j}}}, \\ (n-1)\dfrac{M^P_{S_{i,j-1}} + M^P_{S_{i,j}}}{M^P_{S_{i,1}} + M^P_{S_{i,n}} + 2\sum_{l=2}^{n-1} M^P_{S_{i,l}}} \end{pmatrix} \tag{14}$$

The function (14) and the resulting initial transformation grid $T_C$ is preferably implemented as a computer software routine in computer memory and is shown in FIG. 2 as the transformation approximation component 170.

The parameter p allows for variation and some control of the magnitude of magnification at a particular point. Under normal circumstances, p is expected to lie somewhere between 0 which gives no magnification and 1 which gives maximal magnification. In one form $\lim_{p \to 0}(T_g(p))=I$, equivalent to the identity transformation, and so increased values of p give increased deformation. The invention provides a method to determine a value for the parameter p such that the generated initial state $T_c$ best approximates a transformation with magnification field $M_s$.

As will be apparent, magnification is the derivative of the transformation function. In this way, the largest value of the derivative of the transformation function should correspond to the largest magnification value. Rather than use root mean squared error as described above at step 390 in FIG. 4, approximation is measured by comparing maximal values of magnification fields. This allows for single point comparison, and because the maximal value always occurs at the same point, the derivative need only be calculated at a single point, which saves considerable computation per iteration.

The maximal value of the derivative of the approximating function is calculated using the given parameter p. The maximal intended magnification value $M_s$ is then calculated using the same parameter p. The difference between the maximal value of the derivative and the maximal value of the intended magnification value is then calculated. In the usual case, there will be a difference between this maximal value of the derivative and the maximal value of the intended magnification value. If this difference is larger than a threshold or tolerance, for example 0.05, the value of p is adjusted and the maximal value of the derivative, the maximal intended magnification value and the difference are recalculated.

Once the difference between the values is less than the tolerance or threshold, the current value of p is returned as a result of the function. Using the returned value of p in equation 8 above enables the algorithm to define an initial transformation grid $T_c$ which is close to the desired grid. The initial estimate could then be input to the algorithm 300 at step 320 for further processing by the algorithm.

The calculation of the magnification error $M_E$ and the comparison with a threshold value is implemented as a software program in computer memory and shown in FIG. 2 as a convergence measurer 176.

The advantage of calculating an initial approximation rather than just starting with the identity transformation is that less iterations are required than in the prior art algorithm and hence processing is performed much more quickly and at less computational expense. We have found that the invention in some circumstances generates a poor approximation, but which converges quickly to a desirable solution quickly.

The invention could be applied to any situation where it is desirable to magnify an image or text or other space or object while still maintaining context of the whole image without enlarging the entire image.

One problem encountered with the prior art Keahey algorithm is that it can lead to what is known as buckling. Once several iterations of the Keahey algorithm have been performed, the resulting T from attempting to expand or contract areas begins to develop a jagged appearance, and begins to diverge for further iterations.

The invention provides a solution for this problem, using a system of angle corrections that attempt to constrain the maximum angle created by any three points that are co-linear in the identity transformation. The grid is first searched point by point and if an angle larger than the maximum allowable angle is found, the middle point of the three points is adjusted. Preferably the maximum angle is user defined. Adjustment is preferably horizontal or vertical, depending on the line in which the three points lie, such that its new horizontal or vertical position is the average of the positions of the three points involved.

We have found that the sensitivity of the invention to small changes means that even the small angle correction described above is sufficient to allow the implementation of the algorithm to converge, and because the invention seeks to preserve the essential curvature of the system, the adjustment is not visually noticeable at each iteration level.

In a further form of the invention it is envisaged that an exact rather than an approximate solution could be obtained. An algebraic derivation of a set of $2n^2$ linearly independent equations is possible if derivatives of M are used as extra constraints. Use of derivatives of M is consistent with the properties possessed by "desirable" solutions of undesirable solutions.

In one form the derivation could be found by applying the product rile to equation (8) above, giving:

$$\frac{\partial M_s}{\partial y} = \frac{\partial}{\partial y}\left[\frac{\partial T_x}{\partial x}\right] \cdot \left|\frac{\partial T_y}{\partial y}\right| \qquad (15)$$

-continued
$$\Rightarrow \frac{\partial M_s}{\partial y} = \frac{\partial^2 T_x}{\partial x \partial y} \cdot \frac{\partial T_y}{\partial y} + \frac{\partial T_x}{\partial y} \cdot \frac{\partial^2 T_y}{\partial y^2} \qquad (16)$$

Substitutions are now made of $\Delta x_{i,j} = T_x(i+1, j) - T_x(i-1, j)$ and $\Delta y_{i,j} = T_y(i, j+1) - T_y(i, j-1)$ This results in discrete approximation equations of $$\Delta x_{i,j} \cdot \Delta y_{i,j} = M_{s_{i,j}} \qquad (17)$$

Equation (16) above becomes:

$$(\Delta x_{i,j+1} - \Delta x_{i,j-1}) \cdot \Delta y_{i,j} + (\Delta y_{i,j+1} - \Delta y_{i,j-1}) \cdot \Delta x_{i,j} = M_{s_{i,j+1}} - M_{s_{i,j-1}} \qquad (18)$$

There are still not enough constraints however, as equation (17) above yields $n^2$ equations and equation (18) yields a further $n^2 - 2n$ constraints (as no gradient calculations can be made for points on the edge of the grid).

The ordering (continuity) constraint has yet to be applied and under substition can be easily expressed as:

$$\sum_{i=1}^{n} \Delta x_{i,j} = c \qquad (19)$$

and $$\sum_{j=1}^{n} \Delta y_{i,j} = c \qquad (20)$$

providing a further $2n$ equations, and yielding the required $2n^2$ linearly independent equations required to ensure a unique solution.

It is acknowledged that there is some difficulty in solving the equations. It is, however, possible, that some approximation system based on these equations, rather than the Keahey iterative approach, yields good results.

The foregoing describes the invention including preferred forms thereof. Alterations and modifications as will be obvious to those skilled in the art are intended to be incorporated within the scope hereof, as defined by the accompanying claims.

The invention claimed is:

1. An image distortion method comprising the steps of:
 (a) maintaining in computer memory a set of base data values representing an image to be subjected to a transformation function;
 (b) calculating an initial non identity approximation of the transformation function;
 (c) retrieving from computer memory one or more of the base data values;
 (d) calculating an intended magnification value ($M_c$) for one or more of the retrieved base data values;
 (e) calculating an estimated magnification value ($M_g$) for one or more of the retrieved base data values;
 (f) storing in computer memory the estimated magnification values as a set of transformed data values representing the transformed image;
 (g) calculating a difference ($M_E$) between the estimated magnification value(s) and the intended magnification value(s); and
 (h) repeating steps (c) to (g) until the difference $M_E$ is less than a predefined threshold.

2. The image distortion method as claimed in claim 1 wherein the step of calculating the initial non identity approximation of the transformation function further comprises the steps of:
(a) defining an approximating function G(p) to approximate the transformation function, the approximating function including one or more parameters;
(b) defining an initial value of one of the parameters (p);
(c) calculating a maximal value of the derivative of the approximating function G(p) using the parameter p;
(d) calculating a maximal intended magnification value using the parameter p;
(e) calculating a difference between the maximal value of the derivative of G(p) and the maximal value of the intended magnification value;
(f) adjusting the value of the parameter p; and
(g) repeating steps (c) to (f) until the difference between the maximal value of the derivative of G(p) and the maximal value of the intended magnification value is less than a pre-defmned threshold.

3. An image distortion system for subjecting a set of base data values representing an image to a transformation function, the system comprising:
a transformation approximation component configured to calculate an initial non identity approximation of the transformation function;
an intended magnification calculator configured to calculate an intended magnification value ($M_c$) for one or more of the base data values;
an estimated magnification calculator configured to calculate an estimated magnification value ($M_s$) for one or mare of the data base values; and
a convergence measurer configured to repeat the calculation of the difference ($M_E$) between the estimated magnification value and the intended magnification value until ($M_E$) is less than a pre-defined threshold.

* * * * *